Nov. 8, 1949     V. C. STERRETT     2,487,490
FLOAT VALVE
Filed April 19, 1946     2 Sheets-Sheet 1
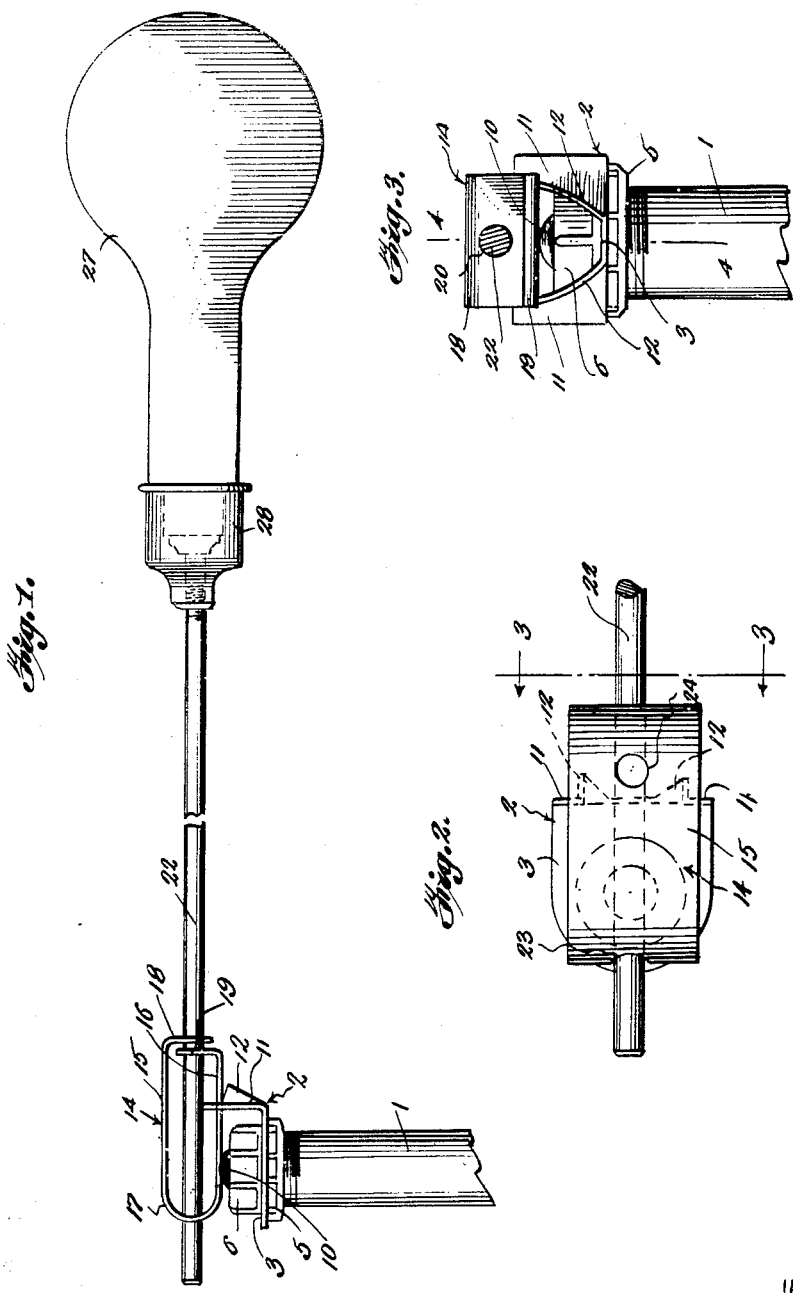
INVENTOR
VANCE C. STERRETT
BY Ross J. Woodward
ATTORNEY Nov. 8, 1949     V. C. STERRETT     2,487,490
FLOAT VALVE
Filed April 19, 1946     2 Sheets-Sheet 2
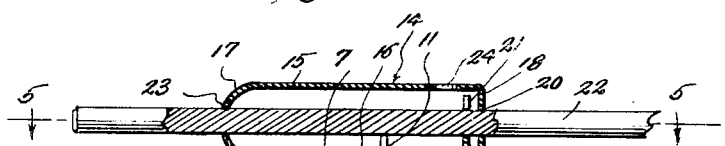
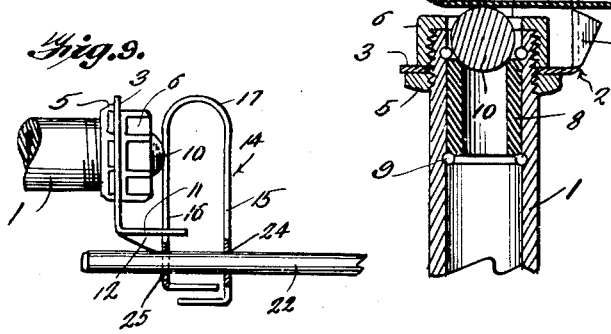
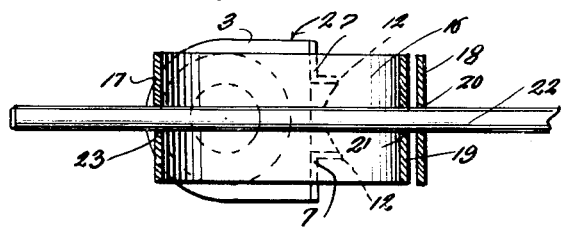
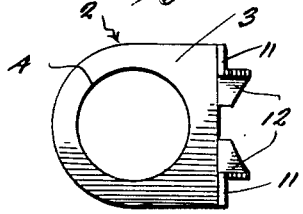
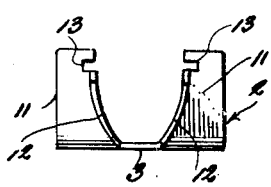
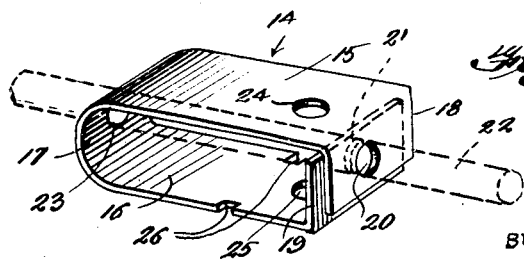
INVENTOR
VANCE C. STERRETT
BY
ATTORNEY Patented Nov. 8, 1949

2,487,490

UNITED STATES PATENT OFFICE 2,487,490

FLOAT VALVE

Vance C. Sterrett, Logansport, Ind.

Application April 19, 1946, Serial No. 663,437

8 Claims. (Cl. 137—104)

This invention relates to an improved float valve of the type used in storage tanks for controlling inflow of water and including a float which moves upwardly as the tank fills and shuts the valve when the tank has been filled to a predetermined depth.

One object of the invention is to provide the improved float valve with an improved clamp for mounting a rod carrying the float, the same clamp serving to close the valve when the float has been moved upwardly by incoming water to such a position that the mounting means forces the valve to a closed position.

Another object of the invention is to provide a float valve wherein the rod-holding clamp is rockably carried by a mounting member secured to the inlet pipe by a nut, the said clamps serving as a retainer for a valve ball and extending across the ball so that as the rod and the clamp are tilted by the upwardly moving float carried by the rod, pressure will be applied to the ball and the ball forced tightly against its seat.

Another object of the invention is to provide a float valve with a rod-holding clamp so formed that the rod may be easily slid longitudinally to adjusted positions and then firmly secured in position to tightly close the valve when water in the tank reaches a predetermined depth.

Another object of the invention is to provide the float valve with a mounting member so formed that while the rod-carrying clamp applied to the mounting member may have tilting movements, its tilting by downward movement of the rod will be limited and excessive displacement of the valve ball prevented.

Another object of the invention is to provide a float valve wherein the mounting and the rod-holding clamp are formed of sheet metal and very simple in construction and inexpensive to manufacture.

The invention is illustrated in the accompanying drawings wherein:

Fig. 1 is a side elevation of the improved float valve.

Fig. 2 is a top plan view showing a portion of the rod and the rod-holding clamp and mounting member for the clamp;

Fig. 3 is a view taken along the line 3—3 of Figure 2.

Fig. 4 is a sectional view taken along the line 4—4 of Figure 3.

Fig. 5 is a sectional view taken along the line 5—5 of Figure 4.

Fig. 6 is a top plan view of the mounting member of the clamp.

Fig. 7 is a view looking at one end of the mounting member.

Fig. 8 is a perspective view of the rod-holding clamp.

Fig. 9 is a side elevation showing the valve applied to a horizontally disposed inlet pipe.

This improved float valve is used to control flow of water or other liquid into a storage tank which may be a stock watering tank or any other type of storage tank. A portion of a water pipe has been shown in the drawings and indicated by the numeral 1, and from an inspection of Figures 1 and 9 it will be seen that the pipe may extend vertically in the tank or horizontally. The inner end portion of the feed pipe is threaded and to this threaded end of the pipe is applied a mounting member 2 which is formed of sheet metal, or other suitable material, and has a base or attached portion 3 through which an opening 4 is formed to receive the pipe. A washer or collar 5 is screwed upon the pipe for the mounting member to rest against and in order to firmly secure the mounting member against the washer there has been provided a crown nut or terminal cap 6 which is screwed upon the pipe and is formed with an opening 7 through which water flows when the valve is open. A tubular valve seat 8 formed of rubber or other suitably resilient substance fits into the pipe where it is held in place by snap rings 9. The tubular valve seat is spaced somewhat from the end of the pipe and upon it rests a valve ball 10 which shuts off flow of water from the pipe when it is held tightly against the valve seat. The tubular valve seat may be easily removed and a new one applied when necessary. At one end the mounting member is formed with arms 11 which project upwardly or perpendicularly from its attaching portion or base 3 and these arms are spaced from each other and formed with diagonally cut inner side edges from which project wings or ears 12. The wings or ears diverge upwardly and have downwardly sloping upper edges, as shown in Figures 1 and 4, and above these ears the arms 11 are formed with notches 13.

A clamp 14 is carried by the mounting member and this clamp is formed from a strip of resilient sheet metal bent to form leaves or jaws 15 and 16 connected by an arcuate bridge 17. Free ends of the jaws are bent to form tongues 18 and 19 through which openings 20 and 21 are formed to receive the rod 22 and the bridge is formed with an opening 23 aligned with the opening 21. It will thus be seen that the rod may be passed through the openings of the tongues and the bridge when the leaf 15 is pressed towards the leaf 16 and when the leaf 15 is released the resiliency of the bridge will cause it to spring away from the leaf 16 and the rod will be firmly gripped and held in a longitudinally adjusted position. Instead of applying the rod longitudinally of the clamp when it may be disposed transversely thereof, as shown in Figure 9, in which case the rod is passed through openings 24 and 25 formed through the leaves or jaws where it will be gripped as the leaf or jaw 15 springs away from the jaw 16 after being pressed toward it for passage of the rod through the openings. Notches 26 are formed in opposite side edge portions of the jaw or leaf 16 in such position that when the clamp is applied to the mounting member and forced between the arms 11 the notches 13 and 26 will interengage and tiltably mount the clamp, tilting movement of the clamp away from the cap 6 being limited by contact of the clamp with the sloping upper edges of the wings 12. The weight of the rod tends to tilt the clamp away from the cap 6 and allow the valve ball to be moved away from the tubular seat 8 for flow of water from the pipe to fill the tank but when the rod is swung upwardly it tilts the clamp and applies pressure to the valve ball to firmly seat the ball upon the valve seat and shut off flow of water. In order to swing the rod upwardly there has been provided a float 27 which has been illustrated as a discarded electric light bulb but it will be understood that other forms of floats may be used. This float is screwed into a socket 28 of the type used for mounting light bulbs and the socket is screwed upon the rod as shown in Figure 1. When the tank is emptied the weight of the rod and the bulb tilts the clamp to a position allowing water to flow from the pipe to fill the tank and as the level of water in the tank reaches the bulb, the bulb will be carried upwardly with the water and the rod will be swung upwardly and tilt or rock the clamp upon the arms 11 of the mounting member to gradually apply pressure to the valve ball and force the ball inwardly until the ball is tightly held against the tubular valve seat and flow of water shut off. By applying pressure to the leaf or jaw 15 grip upon the rod will be released and the rod may be shifted longitudinally if such adjustment is found desirable and if the bulb 27 becomes broken it may be easily unscrewed from the socket 28 and another applied.

Having thus described the invention, what is claimed is:

1. In a valve structure, a mounting member adapted to be mounted about a valve seat and provided with arms spaced from each other transversely of the mounting, ears extending from the arms along inner side edges thereof, the arms being formed with notches above the ears, a clamp formed from a strip of resilient metal bent to form spaced jaws connected at one end by an arcuate bridge and having their free ends bent to form tongues, the bridge and the tongues being formed with openings and the jaws being formed with openings, said clamp being disposed longitudinally of the mounting member with its inner jaw in position to extend across the valve seat and press a closure against the seat, a portion of the inner jaw passing between the arms and formed with side notches engaged in the notches of the arms to mount the clamp for tilting movement towards and away from the valve seat, a rod having an end portion passed through selected openings of the clamp and gripped by the clamp, said rod extending from the clamp and provided with a socket at its outer end, and a light bulb removably mounted in the socket and constituting a float for tilting the rod and the clamp into position to press the closure to a closed position against the valve seat.

2. In a valve structure of the character described, a mounting member adapted to be mounted about a valve seat, arms extending from the mounting member and spaced transversely from each other and provided with ears projecting from their inner side edges, a clamp having inner and outer jaws urged away from each other and having its inner jaw formed in opposite side edges, the inner jaw being fitted between said arms with its notches engaged in the arms to tiltably mount the clamp in position to extend across the valve seat and press a closure against the valve seat, said ears limiting tilting movement of the clamp in a direction allowing limited opening movement of the closure away from the valve seat, a rod gripped by said jaws and extending from the clamp, a socket carried by said rod, and a float removably mounted in said socket.

3. In a valve structure, a mounting member adapted to be mounted about a valve seat and provided with transversely spaced arms having abutment ears along their inner side edges, a clamp for pressing a closure against the valve seat, said clamp having inner and outer jaws connected at one end by a bridge urging the jaws away from each other, the inner jaw being tiltably mounted between the arms in position to extend across the valve seat and a closure and being limited in its tilting movement by the ears, free ends of the jaws being formed with tongues extending from the jaws in overlapped relation to each other, the bridge and the tongues being formed with openings, a rod passed through the openings and gripped by the tongues to firmly hold the rod in longitudinally adjusted positions, and a float connected with the outer end of said rod to move the rod and the clamp from a tilted position allowing movement of the closure away from the valve seat to an opened position to a position wherein the clamp presses the closure to a closed position against the valve seat.

4. In a valve structure, a mounting member adapted to be mounted about a valve seat and having transversely spaced arms carrying abutments and formed with notches above the abutments, a clamp having inner and outer jaws urged away from each other, the inner jaw fitting between said arms and formed with notches engaged in the notches of the arms and pivotally mounting the clamp in position to extend across the valve seat and press a closure against the valve seat when the clamp is tilted to one position and allow movement of the closure away from the valve seat position when the clamp is tilted to another position of adjustment, a rod gripped by the jaws and extending from the clamp, and a float connected with the outer end of the rod.

5. In a valve structure, a mounting member adapted to be mounted about a valve seat and having transversely spaced arms, a clamp tiltably mounted between the arms in position to extend across the valve seat and press a closure against the valve seat to a closed position, ears projecting outwardly from said arms in position for engagement by the clamp when the clamp is tilted away from the seat and thereby limit such tilting movement of the clamp and also limit movement of the closure away from the seat to an opened position, a rod gripped by said clamp and shiftable longitudinally to adjusted positions, and a float connected with said rod.

6. In a valve structure, a mounting member adapted to be mounted about a valve seat, a clamp tiltably carried by the mounting member in position for extending across the valve seat and pressing a closure against the valve seat to a closed position when the clamp is in one tilted position, said clamp allowing the closure to have movement away from the seat to an opened position when the clamp is tilted away from the valve seat, ears projecting outwardly from the mounting in position for engagement by the clamp to limit tilting of the clamp away from the valve seat and thereby limit opening movement of the closure, a rod gripped by said clamp and projecting from the clamp, and a float connected with said rod.

7. In a valve structure, a mounting member adapted to be mounted about a valve seat, a clamp tiltably carried by the mounting in position for extending across the seat and holding a closure in a closed position against the valve seat when the clamp is tilted in one direction, means carried by said mounting for limiting tilting movement of the clamp away from the valve seat and thereby limiting movement of the closure away from the seat to an opened position, said clamp having inner and outer jaws connected at one end by a resilient bridge urging the jaws away from each other and at their free ends being provided with overlapped tongues, the bridge and the tongues being formed with openings, a rod extending longitudinally of the clamp and passed through the openings of the bridge and the tongues and held in a longitudinally adjusted position by grip of the tongues, and a float connected with the free end of said rod.

8. In a valve structure, a mounting member adapted to be mounted about a valve seat, a clamp tiltably carried by the mounting member in position for extending across the valve seat and holding the closure pressed against the seat in a closed position when the clamp is in one tilted position, means carried by said mounting for limiting tilting movement of the clamp away from the valve seat and thereby limiting movement of the closure away from the valve seat, said clamp having inner and outer jaws connected at one end by a resilient bridge urging the jaws away from each other, the bridge and free end portions of the bridge and the jaws being formed with openings, a rod passed through the openings in the jaws and held in an adjusted position by grip of the jaws, and a float connected with the free end of the rod.

VANCE C. STERRETT.

REFERENCES CITED

The following references are of record in the file of this patent:

UNITED STATES PATENTS

| Number | Name | Date |
|---|---|---|
| 1,123,770 | Long | Jan. 5, 1915 |
| 1,178,396 | Hackett | Apr. 4, 1916 |
| 1,226,139 | Stebbins | May 15, 1917 |
| 1,576,600 | Haas | Mar. 16, 1926 |
| 1,690,057 | Coleman | Oct. 30, 1928 |
| 1,832,243 | Ritchie | Nov. 17, 1931 |